US010831023B2

(12) United States Patent
Liu et al.

(10) Patent No.: US 10,831,023 B2
(45) Date of Patent: Nov. 10, 2020

(54) VIRTUAL REALITY-BASED VIEWING SYSTEM TO PREVENT MYOPIA WITH VARIABLE FOCAL-LENGTH AND MAGNIFICATION

(71) Applicant: International Business Machines Corporation, Armonk, NY (US)

(72) Inventors: Su Liu, Austin, TX (US); Inseok Hwang, Austin, TX (US); Eric J. Rozner, Austin, TX (US); Jinho Lee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/140,388

(22) Filed: Sep. 24, 2018

(65) Prior Publication Data
US 2020/0096764 A1 Mar. 26, 2020

(51) Int. Cl.
*G02B 27/01* (2006.01)
*G06F 3/01* (2006.01)

(52) U.S. Cl.
CPC ......... *G02B 27/0101* (2013.01); *G06F 3/013* (2013.01); *G02B 2027/011* (2013.01); *G02B 2027/0127* (2013.01); *G02B 2027/0178* (2013.01)

(58) Field of Classification Search
CPC ........ G02B 27/0172; G02B 2027/0178; G02B 27/0176; G02B 27/0101; G02B 2027/0118
USPC .......................................................... 359/630
See application file for complete search history.

(56) References Cited

U.S. PATENT DOCUMENTS

| | | | |
|---|---|---|---|
| 5,173,724 A | 12/1992 | Bonham et al. | |
| 5,963,667 A * | 10/1999 | Hashimoto | G06K 9/74 382/190 |
| 6,075,525 A | 6/2000 | Hsieh | |
| 2009/0073375 A1 | 3/2009 | Nakada | |
| 2013/0300635 A1* | 11/2013 | White | G02B 3/14 345/7 |
| 2015/0029424 A1 | 1/2015 | Gordon et al. | |

(Continued)

OTHER PUBLICATIONS

Cui et al., "Optical Mapping Near-eye Three-dimensional Display with Correct Focus Cues," Cornell University, May 2017, 5 pages, retrieved from https://arxiv.org/abs/1707.03685.

(Continued)

*Primary Examiner* — Mohammed A Hasan
(74) *Attorney, Agent, or Firm* — Zilka-Kotab, P.C.

(57) ABSTRACT

According to one embodiment, a computer-implemented method for using a variable perceived distance viewing system includes outputting, by a computer, an image to a display visible via a variable-focus converging lens array. The variable-focus converging lens array sets a focal distance to a first perceived distance whereby the image is perceived as being present at the first perceived distance. Furthermore, the computer-implemented method includes adjusting, by the computer, the variable-focus converging lens array for adjusting a focal distance to a second perceived distance and scaling, by the computer, the image on the display to compensate for the focal distance adjustment. The features in the image at the first perceived distance have substantially the same dimensions as the same features in the image at the second perceived distance.

17 Claims, 7 Drawing Sheets

(56) References Cited

U.S. PATENT DOCUMENTS

2016/0363770 A1 12/2016 Kim et al.
2017/0127040 A1 5/2017 Khabiri et al.
2017/0363873 A1 12/2017 Chen

OTHER PUBLICATIONS

Anonymous, "Eyestrain preventive measures during downtime on mobile devices," IP.com Prior Art Database, Technical Disclosure No. IPCOM000226626D, Apr. 19, 2013, 4 pages.

Carnegie et al., "Reducing Visual Discomfort with HMDs Using Dynamic Depth of Field," Virtual Reality Software and Technology, IEEE Computer Society, Sep.-Oct. 2015, pp. 34-41.

Dolgin, E., "The Myopia Boom," Nature, vol. 519, Mar. 19, 2015, pp. 276-278.

Pan et al., "Worldwide prevalence and risk factors for myopia," Ophthalmic & Physiological Optics, vol. 32, 2011, pp. 3-16.

Davies, A., "Oculus Rift Vs. HTC Vive Vs. PlayStation VR," tom'sHardware, May 16, 2016, 7 pages, retrieved from https://www.tomshardware.co.uk/vive-rift-playstation-vr-comparison,review-33556-3.html.

Oculus, "Best Practices Guide," Oculus VR, LLC, Dec. 2014, 52 pages, retrieved from http://static.oculusvr.com/documents/health-and-safety-warnings.pdf.

Heiting, G., "Myopia: Frequently Asked Questions," All About Vision.com, Dec. 2018, 3 pages, retrieved from https://www.allaboutvision.com/faq/myopia.htm.

Grand View Research, "mHealth App Market by Type (Fitness, Lifestyle Management, Nutrition & Diet, Women's Health, Healthcare Providers, Disease Management) and Segment Forecasts, 2018-2025," Grand View Research, Market Research Report, Aug. 2017, 7 pages, retrieved from https://www.grandviewresearch.com/industry-analysis/mhealth-app-market.

Reuters, "Global Virtual Reality Market Forecast 2020 by Major Players such as Sony, Microsoft, Facebook, HTC, Google, Samsung Electronics, GoPro, etc," Reuters, Apr. 24, 2017, retrieved from https://www.reuters.com/brandfeatures/venture-capital/article?id=4975.

Harris Williams & Co., "Vision Industry Update," HarrisWilliams &Co., Mar. 2017, 14 pages, retrieved from https://www.harriswilliams.com/system/files/industry_update/vision_industry_update_hcls.pdf.

Beck, J., "In 2050, Half the World Will Be Nearsighted," The Atlantic, Feb. 19, 2016, 5 pages, retrieved from https://www.theatlantic.com/health/archive/2016/02/in-2050-half-the-world-will-be-nearsighted/468606/.

* cited by examiner

VIRTUAL REALITY-BASED VIEWING SYSTEM TO PREVENT MYOPIA WITH VARIABLE FOCAL-LENGTH AND MAGNIFICATION

BACKGROUND

The present invention relates to virtual reality-based viewing, and more specifically, this invention relates to a system of variable focal-length and magnification to prevent myopia.

Myopia, or near-sightedness, occurs in an individual because of light entering the individual's eye is not focused correctly and thus, distant objects appear blurred while close objects appear in focus. More specifically, the eyeball becomes too long relative to the focusing power of the cornea and lens of the eye, and thus, light rays focus at a point in front of the retina, rather than directly on its surface.

The prevalence of myopia has been growing in general populations worldwide. According to recent studies in the United States and Europe, approximately half of young adults are affected by myopia, doubling the prevalence of myopia fifty years ago. Moreover, studies report that one third of the world's population, approximately 2.5 billion people, may be affected by near-sightedness by the end of 2020.

It is highly possible that eye fatigue from computer use and other extended near vision tasks may contribute to an increase in the prevalence of myopia in many populations. Prolonged viewing of a target at a short, constant distance has been shown to increase the probability of myopia development. Several factors possibly contribute to development of myopia: extended duration of viewing, viewing at a short distance, and viewing at a short distance for a long period of time. For example, children who read continuously for more than 30 minutes were more likely to develop myopia compared to those who read for less than 30 minutes continuously. Children who performed near-work at less than 30 centimeters (cm) were 2.5 times more likely to have myopia than those who worked at a longer distance. Children who spent a longer time reading for pleasure and those who read at a distance closer than 30 cm were more likely to have higher myopic refractions.

Thus, continuous viewing activities, such as reading a book, reading an electronic book (e-book), and browsing the internet inherently involves a common problem: a constant focal length from the eyes for an extended period. The problem is perpetuated by the limitations of a constant distance of the object (book, e-book, computer screen, etc.) from the viewer.

Khabiri et al have addressed eye fatigue reduction in head-mounted systems (U.S. Publication Patent Number 2017/0127040) to modify the user's content item and to encourage the user to take an eye-fatigue reduction action and display the modified content item by the display device of the binocular head mounted display. However, Khibiri's system is disruptive to the user viewing an activity. Bonham et al have presented an optical system to reduce eye strain that includes two or more images at varying focal distances, which when viewed consecutively and in repetition will exercise the ciliary muscle of the eyes (U.S. Pat. No. 5,173,724). However, Bonham's optical system is a system solely designed to exercise the muscles of the eye; Bonham's system does not address exercising the user's eyes while they are viewing an activity, preferably while the user is viewing the activity undisturbed.

A solution remains elusive for mitigating the development of myopia while a user is using their eyes to view an activity at close range for a prolonged period.

SUMMARY

Various embodiments described herein provide a solution to the problem of growing incidence of myopia in the general population. According to one approach, a new viewing system is described that deliberately varies the optical distance of the eye of a user to a target while maintaining a constant object size seen from the eyes of a user. Various techniques described herein solve a fundamental problem of eye fatigue and myopia in a user that develops while a user is viewing a scene at a constant distance for a prolong period. Accordingly, as described herein, the inventive systems and/or methods substantially adjust the optical distance of a scene being viewed by a user without the user aware of the adjustment of optical distance. For example, the system may compensate for the size changes of the image induced by adjusting optical distance by dynamic rescaling of the image so that the user remains unaware of the adjustment of optical distance of the scene being viewed by the user.

In one embodiment, a computer-implemented method for using a variable perceived distance viewing system includes outputting, by a computer, an image to a display visible via a variable-focus converging lens array. The variable-focus converging lens array sets a focal distance to a first perceived distance whereby the image is perceived as being present at the first perceived distance. Furthermore, the computer-implemented method includes adjusting, by the computer, the variable-focus converging lens array for adjusting a focal distance to a second perceived distance and scaling, by the computer, the image on the display to compensate for the focal distance adjustment. In one approach, the adjusting the focal distance to the second perceived distance includes selecting a second perceived distance from a range of perceived distances having a minimum perceived distance and a maximum perceived distance and a series of perceived distances distributed evenly between the minimum perceived distance and the maximum perceived distance. Moreover, the features in the image at the first perceived distance have substantially the same dimensions as the same features in the image at the second perceived distance.

In another embodiment, a computer program product for using a variable perceived distance viewing system to prevent myopia of a user. The computer program product includes a computer readable storage medium having program instructions embodied therewith, wherein the computer readable storage medium is not a transitory signal per se, the program instructions executable by a processor to cause the processor to perform the foregoing method.

In yet another embodiment, a computer-implemented method includes outputting, by the processor, an image to a display visible via a variable-focus converging lens array. The variable-focus converging lens array sets a focal distance to a first perceived distance whereby the image is perceived as being present at the first perceived distance. Furthermore, the computer-implemented method includes determining, by the processor, a parameter associated with the image has been achieved, in response to the determination the parameter has been achieved, adjusting, by the processor, the variable-focus converging lens array for adjusting a focal distance to a second perceived distance, and scaling, by the processor, the image on the display to compensate for the focal distance adjustment. The features in the image at the first perceived distance have substantially the same dimensions as the same features in the image at the second perceived distance.

Other aspects and embodiments of the present invention will become apparent from the following detailed description, which, when taken in conjunction with the drawings, illustrate by way of example the principles of the invention.

DETAILED DESCRIPTION

The following description is made to illustrating the general principles of the present invention and is not meant to limit the inventive concepts claimed herein. Further, features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for a viewing system that varies the optical distance of a viewer to a target while maintaining a constant object size of the target as seen from the eyes of the viewer.

In one general embodiment, a computer-implemented method for using a variable perceived distance viewing system includes outputting, by a computer, an image to a display visible via a variable-focus converging lens array. The variable-focus converging lens array sets a focal distance to a first perceived distance whereby the image is perceived as being present at the first perceived distance. The computer-implemented method includes adjusting, by the computer, the variable-focus converging lens array for adjusting a focal distance to a second perceived distance and scaling, by the computer, the image on the display to compensate for the focal distance adjustment. The features in the image at the first perceived distance have substantially the same dimensions as the same features in the image at the second perceived distance.

In another general embodiment, a computer program product for using a variable perceived distance viewing system to prevent myopia of a user. The computer program product includes a computer readable storage medium having program instructions embodied therewith, wherein the computer readable storage medium is not a transitory signal per se, the program instructions executable by a processor to cause the processor to perform the foregoing method.

In yet another general embodiment, a computer-implemented method includes outputting, by the processor, an image to a display visible via a variable-focus converging lens array. The variable-focus converging lens array sets a focal distance to a first perceived distance whereby the image is perceived as being present at the first perceived distance. Furthermore, the computer-implemented method includes determining, by the processor, a parameter associated with the image has been achieved, in response to the determination the parameter has been achieved, adjusting, by the processor, the variable-focus converging lens array for adjusting a focal distance to a second perceived distance, and scaling, by the processor, the image on the display to compensate for the focal distance adjustment. The features in the image at the first perceived distance have substantially the same dimensions as the same features in the image at the second perceived distance.

Figure 1:
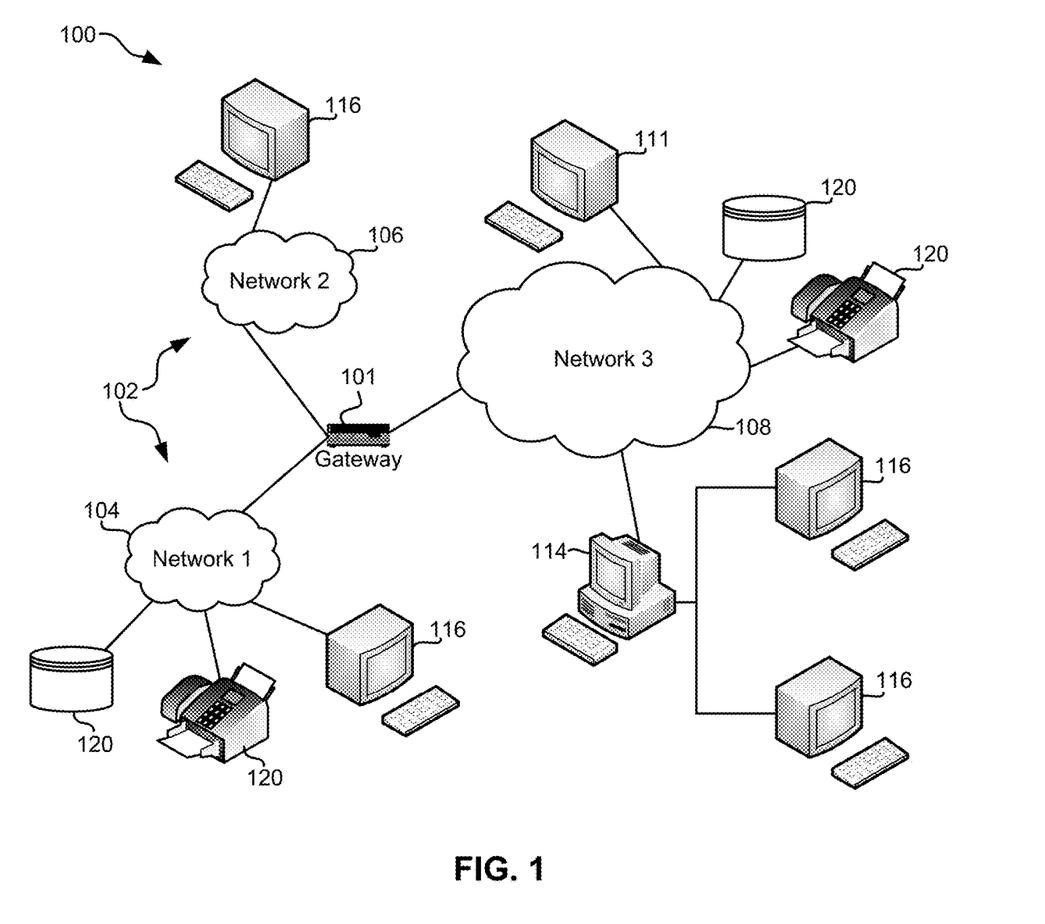
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
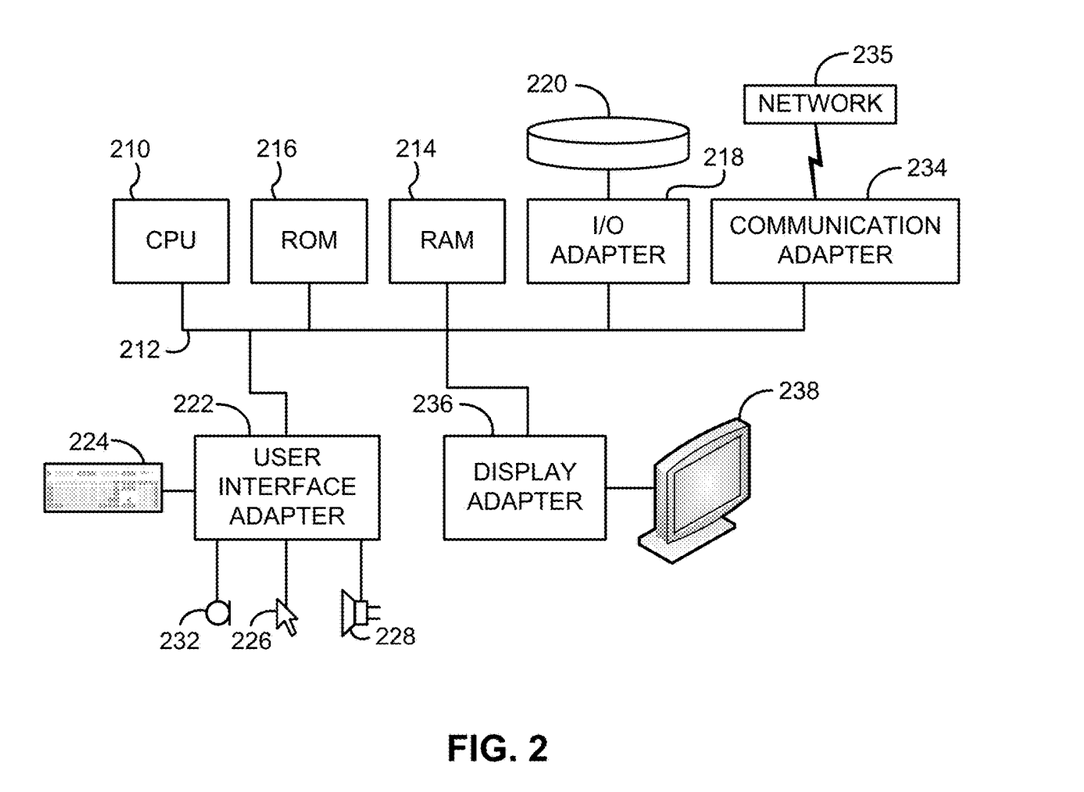
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
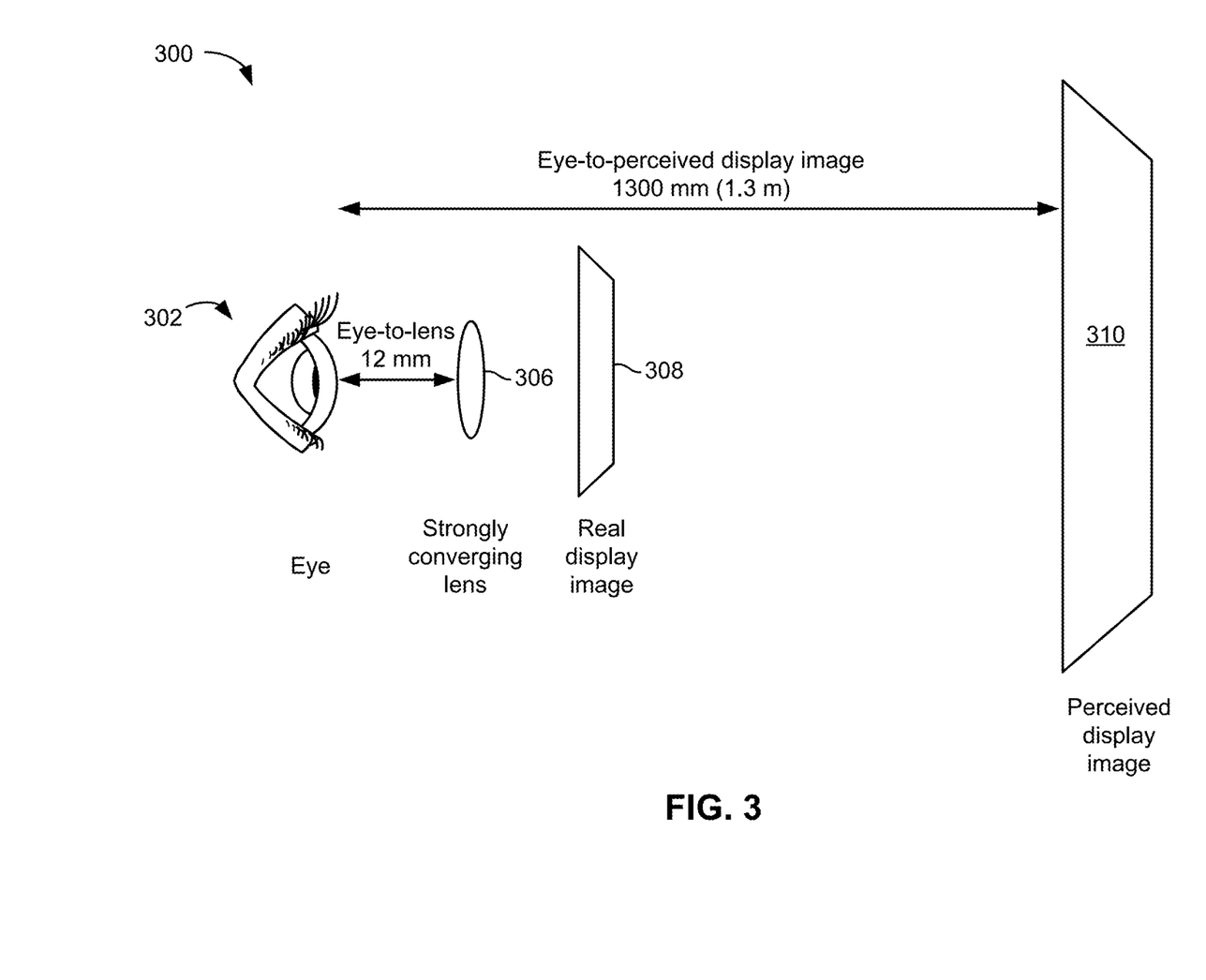
FIG. 3 is a schematic drawing of a virtual reality system.

Now referring to FIG. 3, a schematic drawing is shown of using Virtual Reality (VR) eyewear (e.g. an Oculus Rift). According to the conventional virtual reality system 300 shown, the eye-to-lens distance represents the distance from a strongly converging lens 306 to the user's eye 302. Typically, in some conventional VR systems, the eye-to-lens distance is approximately 12 millimeters (mm). The strongly converging lens allows display of an image a real display 308 of the VR system as a perceived image 310 at an eye-to-perceived distance of approximately 1300 mm (or 1.3 meters).

According to various embodiments described herein, a system, enabled on conventional VR hardware, adaptively scales content being viewed by a user to compensate the optical distance changes, so that the user will not perceive the distance changes but still fully benefits from the optical distance changes. Thus, eye fatigue in the user may be relieved. Moreover, the system described herein changes the optical distance to the content viewed by the user while maintaining the size of the objects in the image identical at the different perceived distances. Thus, the user may not notice the optical distance change. According to various approaches described herein, the system combines concurrently eye-strain relaxation effects with everyday activities (e.g. reading, gaming, watching videos, etc.).

According to various embodiments, the system and methods described herein function independent of the user. For example, while the user may be aware that the system is operative to perform the aforementioned preventative techniques, the user may remain essentially unaware of the background operations employed to mitigate eye fatigue of the user while the user views the content using the system described herein. The system is ideally user-transparent and non-interfering with the user's activity using the VR system (e.g. reading, watching a video, reading pages on the internet, gaming, etc.).

According to one embodiment, a method utilizes a virtual reality system to vary the distance of a perceived image while keeping the size of the image constant, which may minimize development of myopia in a viewer. According to various approaches, content (e.g., an e-book, a video, a game, etc.) is presented to a user via a VR system in a manner such that the user remains unaware that the optical distance of the image of the content in the VR system is continuously, periodically, randomly, etc. (and combinations thereof) being adjusted between the user's eye and the image of the content on display.

Figure 4:
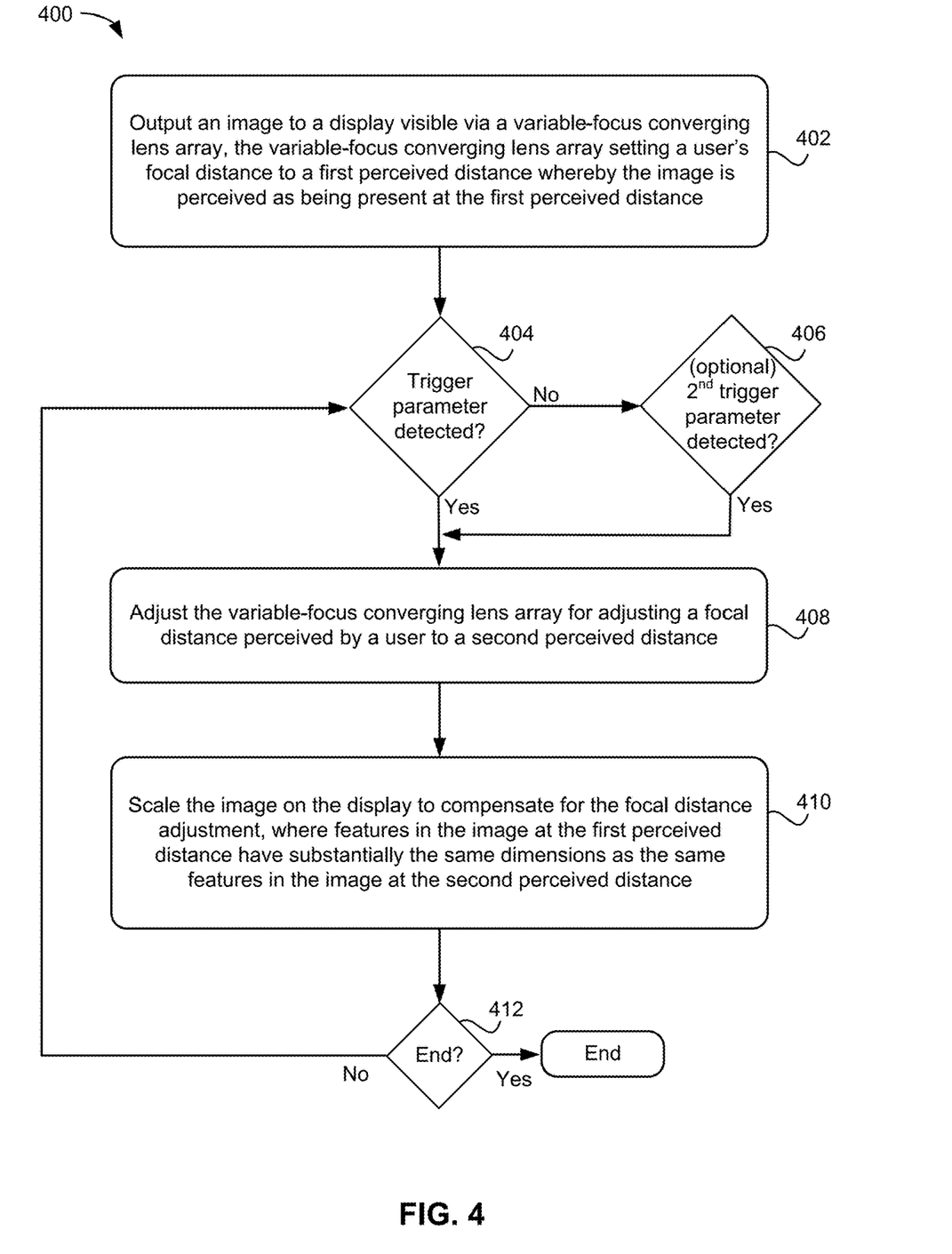
FIG. 4 is a flowchart of a method, according to one embodiment.

Now referring to FIG. 4, a flowchart of a method 400 for using a variable perceived distance viewing system to mitigate myopia of a user is shown according to one embodiment. The method 400 may be performed in accordance with the present invention in any of the environments depicted in FIGS. 1-5C, among others, in various embodiments. Of course, more or less operations than those specifically described in FIG. 4 may be included in method 400, as would be understood by one of skill in the art upon reading the present descriptions.

Each of the operations of the method 400 may be performed by any suitable component of the operating environment. For example, in various embodiments, the method 400 may be partially or entirely performed by virtual reality system (e.g. virtual reality eyewear), or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, that includes outputting an image to a display visible via a variable-focus converging lens array. The variable-focus converging lens array may set a user's focal distance to a first perceived distance whereby the image is perceived as being present at the first perceived distance. In various approaches, the image is an image of a content selected by the user. In some approaches, the user may be reading an e-book on the VR system, where the image is a page of the e-book. In other approaches, the user may be watching a video, where the image is a scene or series of scenes of the video. In other approaches, the user may be reading a website on the internet, where the image may be a page of the website. In yet other approaches, the user may be playing a game, where the image may be a scene of the game. These approaches are examples only and are not meant to be limiting in any way.

Images viewed by a user for an extended period may have a perceived distance in a range of approximately 0.75 and 3.5 meters. In some approaches, variable perceived distances between 0.75 to 3.5 meters may also ease eyestrain. In preferred approaches, an image may be displayed at variable perceived distances in a range of 1.3 meters to 2.5 meters. In some approaches, a perceived distance of less than about 0.75 meters may induce a converging of the eyes on images closer than the comfortable distance range and thus may cause the lenses of the eyes to misfocus, making clearly rendered objects appear blurry as well as lead to eyestrain.

Figure 5A:
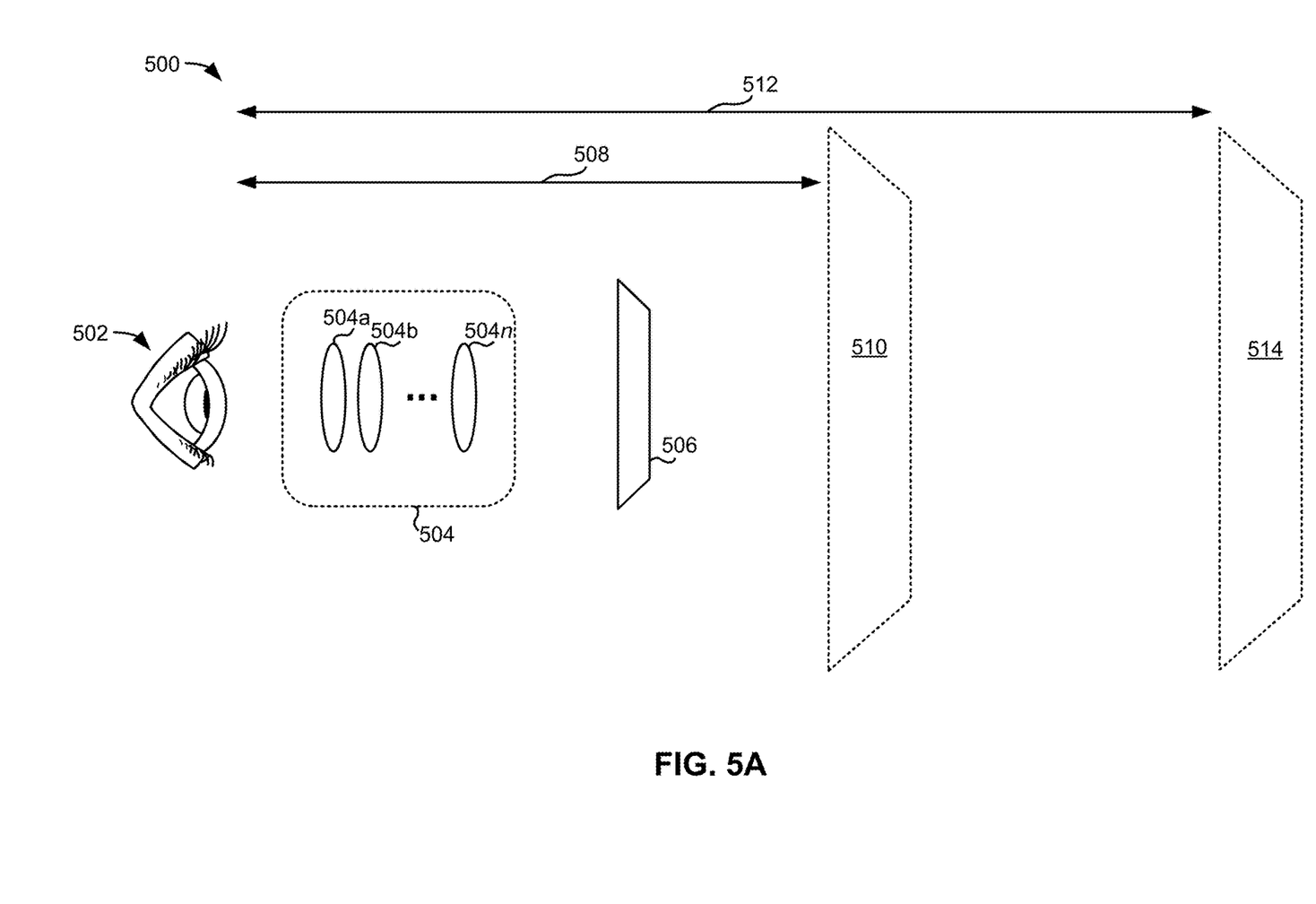
FIGS. 5A-5C are schematic drawings of a variable perceived distance viewing system, according to one embodiment.

FIG. 5A depicts a schematic drawing of an overview of one embodiment of a method of creating variable perceived distances. FIG. 5A shows a variable-focus converging lens array 504 in a virtual reality system 500. The variable-focus converging lens array 504 may be of known construction, and in preferred approaches is comprised of a series of lenses 504a, 504b . . . 504n. As shown in the system 500, the variable-focus converging lens array 504 sets variable focal distances to cause the user's eye 502 to view perceived images 510, 514 at perceived distances 508, 512, respectively, using a real display surface 506 of the VR system 500 that does not change in distance from the user's eye. The variable-focus converging lens array 504 may be controlled to vary the focal length created by the variable-focus converging lens array 504 to generate perceived distances 508, 512. The one or more lenses 504a, 504b, 504n of the variable-focus converging lens array 504 allows dynamic adjustment of the focal length to adjust the optical distance (e.g. perceived distance 508, 512) and consequently the perceived images 510, 514 of the content.

Referring back to FIG. 4, operation 408 of method 400 includes adjusting the variable-focus converging lens array for adjusting a focal distance from a present perceived distance to a second perceived distance. The perceived distances are preferably farther from the user's eye than the actual display. The focal distance may be adjusted in the viewing apparatus, under direction of the inventive process presented herein, via known techniques for controlling the variable-focus converging lens array.

As illustrated in FIG. 5A, in some approaches, the variable-focus converging lens array 504 may adjust a focal distance from a "near" perceived distance 508 to a "far" perceived distance 512. In other approaches, the variable-focus converging lens array 504 may adjust a focal distance from a "far" perceived distance 512 to a "near" perceived distance 508.

In some approaches, adjustment of the focal distance to the second perceived distance may be triggered by at least one parameter related to the image. As shown in FIG. 4, in some approaches, operation 408 may be preceded by operation 404 of determining whether a parameter related to the image has occurred. Determining that the parameter has occurred triggers adjustment of the focal distance. A parameter related to an image may be a characteristic of the content in the image being viewed by the user. For example, if a user is viewing an e-book and reading images of pages of the e-book, the parameter may be an elapsed time (e.g. 30 seconds, 1 minute, 2 minutes, etc.). In some approaches, the parameter may be page transition, for example, each time the user turns to a new page. In some approaches in which the content is watching a video or playing a game, the parameter may be a content transition. Various parameters within content transition may include theme transition, angle transition, brightness transition, music transition, object focus, etc.

In some approaches, the parameter of the image of the content (e.g. time elapsed) may be defined for convenience of the user. In other approaches, the parameter of the image of the content may be defined for clinical effectiveness to mitigate myopia of the user.

In some approaches, method 400 may include an operation 406 of determining whether a second parameter has occurred if a first parameter of operation 404 has not been detected. Any number of such parameters may be monitored, any of which, alone or in predefined combinations, may trigger adjustment of the focal distance. In various approaches, the parameters of the content may be a combination, for example the first parameter is time elapsed and the second parameter is page transition. These approaches are presented by way of example only and are not meant to be limiting in any way.

In some approaches, if operations 404/406 determine that a parameter of the content has occurred, then operation 408 is prompted to adjust the variable-focus converging lens array to adjust the focal distance to a second perceived distance. The adjusting of the focal distance in response to a trigger may occur immediately or after a predefined time period upon detecting the trigger parameter(s). In other approaches, the timing of the adjustment may be more dynamic. For example, the incremental adjustment of the focal distance may be triggered by a page transition, but if time extends beyond a set limit, then the parameter of time lapsed may trigger an adjustment in focal distance before the trigger of page transition. In various approaches, the limits of the parameters to set the triggers may vary according to the application. In some approaches, the limits of the parameters to set the triggers may be defined by the user before initiating the method.

Following operation 408 of adjusting the focal distance to a second perceived distance, operation 410 includes scaling the image on the display to compensate for the focal distance adjustment, where features in the image at the first perceived distance have substantially the same dimensions as the same features in the image at the second perceived distance. Illustrative features include textual characters, textual strings, objects in the image, etc. In various approaches, operation 410 compensates the image adjustment effect on the display surface in a conventional VR system in response to a focal distance adjustment.

In some approaches, once the second perceived distance is adjusted in operation 408, the display image is scaled in operation 410 (e.g. magnifying the image or shrinking the image) to maintain a constant size of the objects of the image at the two different perceived distances. In other words, though the focal distance has changed, the image appears to the user to be virtually identical in size as it was at the former focal distance. In some approaches, operation 410 occurs immediately after operation 408. In other approaches, the adjusting of operation 408 is configured and the scaling of operation 410 is configured, and then the adjusting and scaling are applied simultaneously to the VR system.

In some approaches, the perceived image on the display is proportional to the perceived distance. For example, if the focal distance of the image has been adjusted to twice the length (farther) of the previous focal distance, then the perceived distance will be twice as far, and without the scaling of operation 410, the size of the objects of the image may appear twice as small. Thus, operation 410 includes scaling the image (e.g. increase magnification) to compensate for the focal distance change. In this case, the focal distance of the image has been changed by a factor of two, so the image is scaled by a factor of two thereby resulting in the objects of the image appearing unchanged at a constant size in the image compared to the same objects of the image at the previous perceived distance.

Figure 5B:
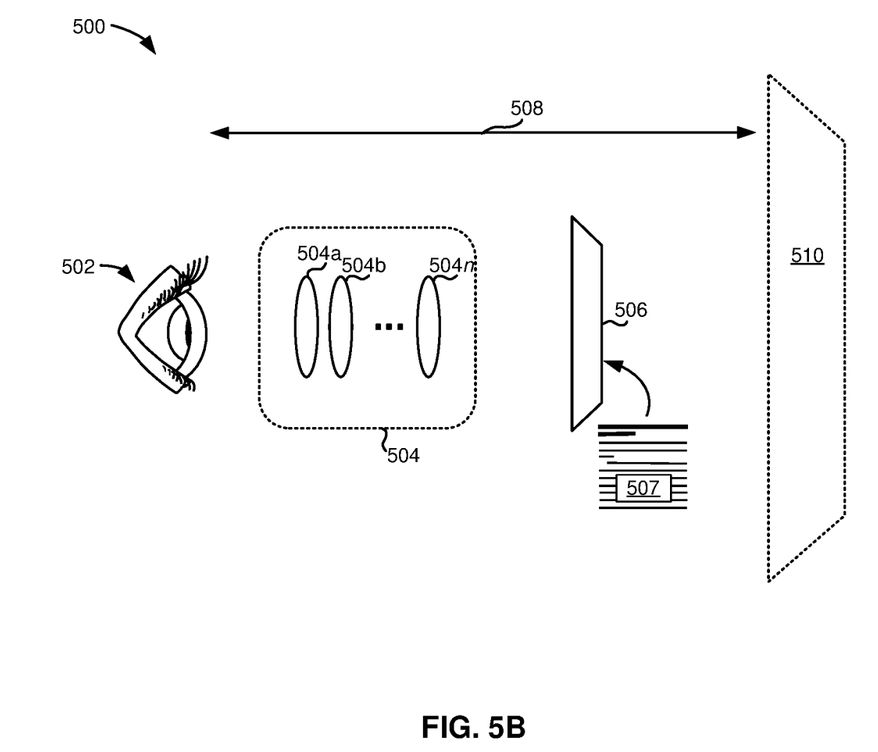

FIG. 5B illustrates a system 500 with the user viewing a perceived image 510 at a perceived distance 508. In one approach, operation 408 adjusts the variable-focus converging lens array 504 for adjusting the focal distance to a "near" perceived distance 508. At the "near" perceived distance 508, objects of the image on the real display surface 506 may appear larger to reflect the "near" perceived distance 508. Thus, directly following operation 408, operation 410 includes scaling the image 507 on the real display surface 506 to a smaller image to compensate for the scale-up effect due to near distance. As a result, at the first perceived distanced, the "near" perceived distanced 508, the user views the object of the perceived image 514 at a standard size.

Figure 5C:
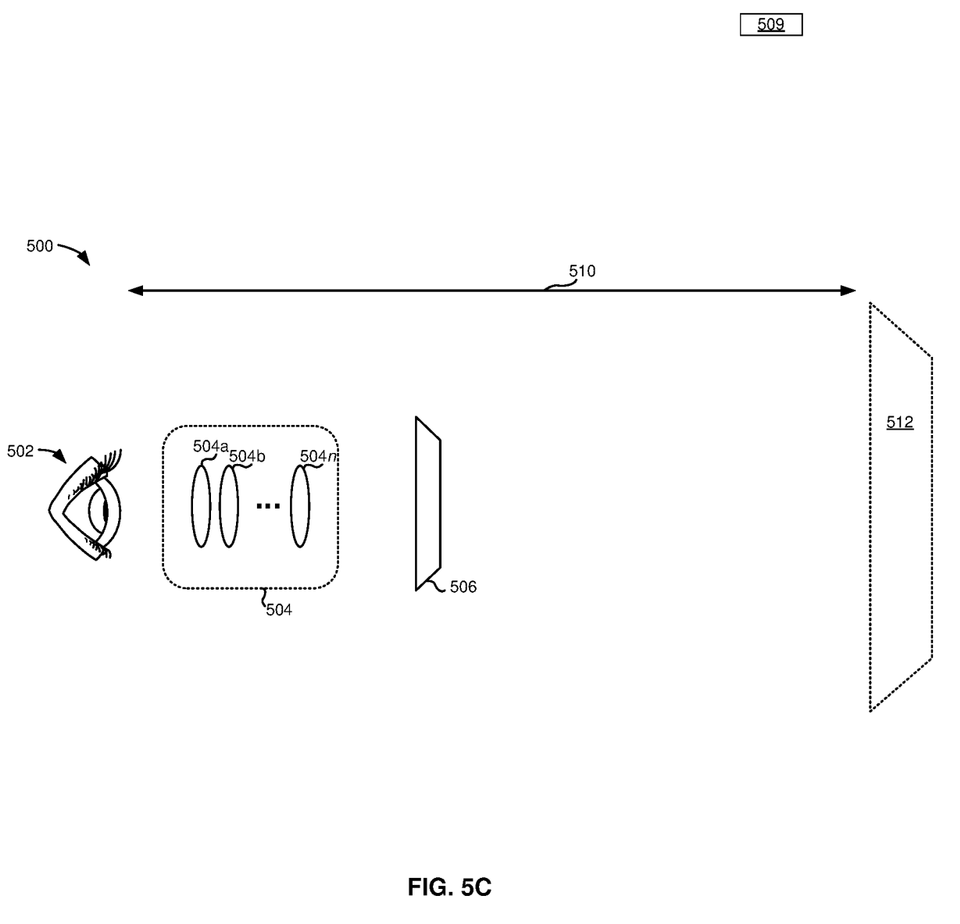

The schematic diagram in FIG. 5C illustrates adjusting the focal distance to a second perceived distance. Objects of an image viewed at "far" perceived distance on a conventional VR system will appear on a display surface as smaller. As described herein, operation 410 includes scaling the image on the real display surface 506 to a larger image 514 on the display surface when presenting the image at the "far" perceived distance 512 to compensate for the focal distance adjustment (e.g. scale-down effect due to far distance). As a result, at the second perceived distance, the "far" perceived distance 512, the user views the object of the image 514 at a standard size (e.g. unchanged from the size at the "near" perceived distance 512 of FIG. 5B).

Looking back to FIG. 4, in some approaches of method 400, the adjusting the focal distance to the second perceived distance (operation 408) is variable. The adjusting of the focal distance to a second perceived distance may include increasing the focal distance to a "far" perceived distance, or "farther" perceived distance if the first perceived distance is a "far" perceived distance. Moreover, the adjusting of the focal distance to a second perceived distance may include decreasing the focal distance to a "near" perceived distance, or "nearer" perceived distance if the first perceived distance is a "near" perceived distance. The adjusting of the focal distance to a second perceived distance may vary for each trigger parameter detected, such that the adjusting may increase the focal distance or decrease the focal distance in response to detection of a parameter that triggers an adjustment in perceived distance.

In some approaches, the adjusting of a focal distance to a second perceived distance includes selecting a second perceived distance from a range of perceived distances having a minimum perceived distance, a maximum perceived distance, and a series of perceived distances distributed evenly between the minimum perceived distance and the maximum perceived distance. In some approaches, the range of perceived distances may be large range spanning across many lengths of distances. Larger ranges of perceived distances may provide stronger relaxation effects on eye fatigue of the user.

In some approaches, the focal distance is adjusted to generate a selected second perceived distance. In some approaches, the focal distance may be adjusted within the limits of the optical system. For example, the focal distance may be adjusted to within 20% of the minimum and maximum limits of the optical hardware used in the VR system.

As would be understood by one skilled in the art, a minimum and a maximum may be defined by the optical hardware used in the VR system. In some approaches, the minimum and maximum perceived distances may be represented by a zoom ratio of 100% as a minimum and a zoom ratio of 500% as a maximum. In some approaches, the maximum perceived distance may be the extent to which a user may be able to view an image comfortably at a far distance, for example, approximately 3.5 meters. Likewise, a minimum perceived distance may be the extent to which a user may be able to view an image comfortably at a near distance, for example, approximately 0.75 meters.

The range of perceived distances between the maximum and minimum includes a series of perceived distances distributed evenly. For example, a range of about 0.75 meters to about 3.5 meters may include a series of perceived distances such as: 1.0 meter, 1.25 meters, 1.5 meters, 2.0 meters, 2.5 meters, 3.0 meters, and 3.5 meters. In some approaches, the step between each perceived distance in a series may be higher or lower (e.g. 1.0 meters, 0.1 meters, etc.). In various approaches, the adjusting of focal distance to perceived distances may vary gradually with small incremental adjustments. In other approaches, the adjusting of focal distance to perceived distances may vary in larger incremental adjustments. In yet other approaches, the adjusting of focal distance to perceived distances may include gradual small incremental adjustments and large incremental adjustments.

Looking back to FIG. 4, in various approaches, method 400 continues with decision 412 where the process returns to repeat the series of operations (operations 404, 406, 408, 410) until the process ends. In some approaches, the end may be a predefined end set by the user. In other approaches, the end may be triggered by a device when a user ceases to use the VR system. These approaches are presented by way of example only and are not meant to be limiting in any way.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for using a variable perceived distance viewing system, the method comprising:
   outputting, by a computer, an image to a display visible via a variable-focus converging lens array, the variable-focus converging lens array setting a focal distance to a first perceived distance whereby the image is perceived as being present at the first perceived distance;

adjusting, by the computer, the variable-focus converging lens array for adjusting a focal distance to a second perceived distance; and scaling, by the computer, the image on the display to compensate for the focal distance adjustment, wherein features in the image at the first perceived distance have substantially the same dimensions as the same features in the image at the second perceived distance.

2. The computer-implemented method as recited in claim 1, wherein a perceived distance is in a range of about 0.75 meters to about 3 meters.

3. The computer-implemented method as recited in claim 1, wherein the image is selected from the group consisting of: an electronic book, a video, a website, and a game.

4. The computer-implemented method as recited in claim 1, wherein the adjusting the focal distance to the second perceived distance comprises selecting a second perceived distance from a range of perceived distances having a minimum perceived distance and a maximum perceived distance and a series of perceived distances distributed evenly between the minimum perceived distance and the maximum perceived distance.

5. The computer-implemented method as recited in claim 1, wherein the adjusting the focal distance to the second perceived distance is variable, wherein the adjusting is selected from the group consisting of: increasing the focal distance and decreasing the focal distance.

6. The computer-implemented method as recited in claim 1, wherein the adjusting the focal distance to the second perceived distance is triggered by at least one parameter related to the image.

7. The computer-implemented method as recited in claim 6, wherein the at least one parameter related to the image is selected from the group consisting of: time elapsed, page transition, and content transition.

8. The computer-implemented method as recited in claim 1, wherein the image on the display is proportional to the second perceived focal distance.

9. The computer-implemented method as recited in claim 1, wherein the variable perceived distance viewing system is a virtual reality eyewear.

10. The computer-implemented method as recited in claim 1, wherein the series of operations is repeated until an end.

11. A computer program product for using a variable perceived distance viewing system to prevent myopia of a user, the computer program product comprising a computer readable storage medium having program instructions embodied therewith, wherein the computer readable storage medium is not a transitory signal per se, the program instructions executable by a processor to cause the processor to perform the method comprising:

outputting, by the processor, an image to a display visible via a variable-focus converging lens array, the variable-focus converging lens array setting a focal distance to a first perceived distance whereby the image is perceived as being present at the first perceived distance;

adjusting, by the processor, the variable-focus converging lens array for adjusting a focal distance to a second perceived distance; and scaling, by the processor, the image on the display to compensate for the focal distance adjustment, wherein features in the image at the first perceived distance have substantially the same dimensions as the same features in the image at the second perceived distance.

12. The computer program product of claim 11, wherein a perceived distance is in a range of about 0.75 meters to about 3 meters.

13. The computer program product as recited in claim 11, wherein the image is selected from the group consisting of: an electronic book, a video, a website, and a game.

14. The computer program product as recited in claim 11, wherein the adjusting the focal distance to the second perceived distance comprises selecting a second perceived distance from a range of perceived distances having a minimum perceived distance and a maximum perceived distance and a series of perceived distances distributed evenly between the minimum perceived distance and the maximum perceived distance.

15. The computer program product as recited in claim 11, wherein the adjusting the focal distance to the second perceived distance is triggered by at least one parameter related to the image.

16. The computer-implemented method as recited in claim 1, wherein the series of operations is repeated until an end.

17. A computer-implemented method comprising outputting, by the processor, an image to a display visible via a variable-focus converging lens array, the variable-focus converging lens array setting a focal distance to a first perceived distance whereby the image is perceived as being present at the first perceived distance;

determining, by the processor, a parameter associated with the image has been achieved, in response to the determination the parameter has been achieved, adjusting, by the processor, the variable-focus converging lens array for adjusting a focal distance to a second perceived distance; and scaling, by the processor, the image on the display to compensate for the focal distance adjustment, wherein features in the image at the first perceived distance have substantially the same dimensions as the same features in the image at the second perceived distance.

* * * * *